Fig. I

INVENTORS.
William M. McConnell
Raymond L. Carey
BY
Webb, Mackey & Burden
THEIR ATTORNEYS

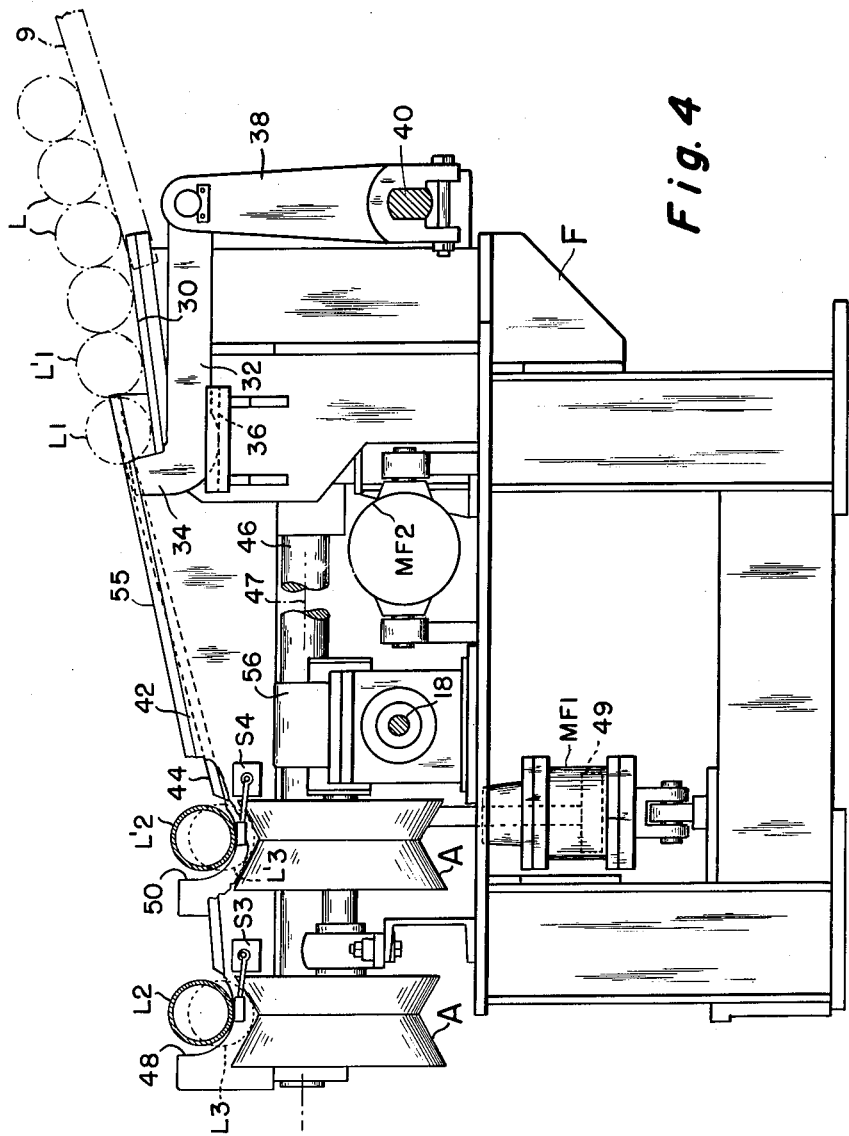

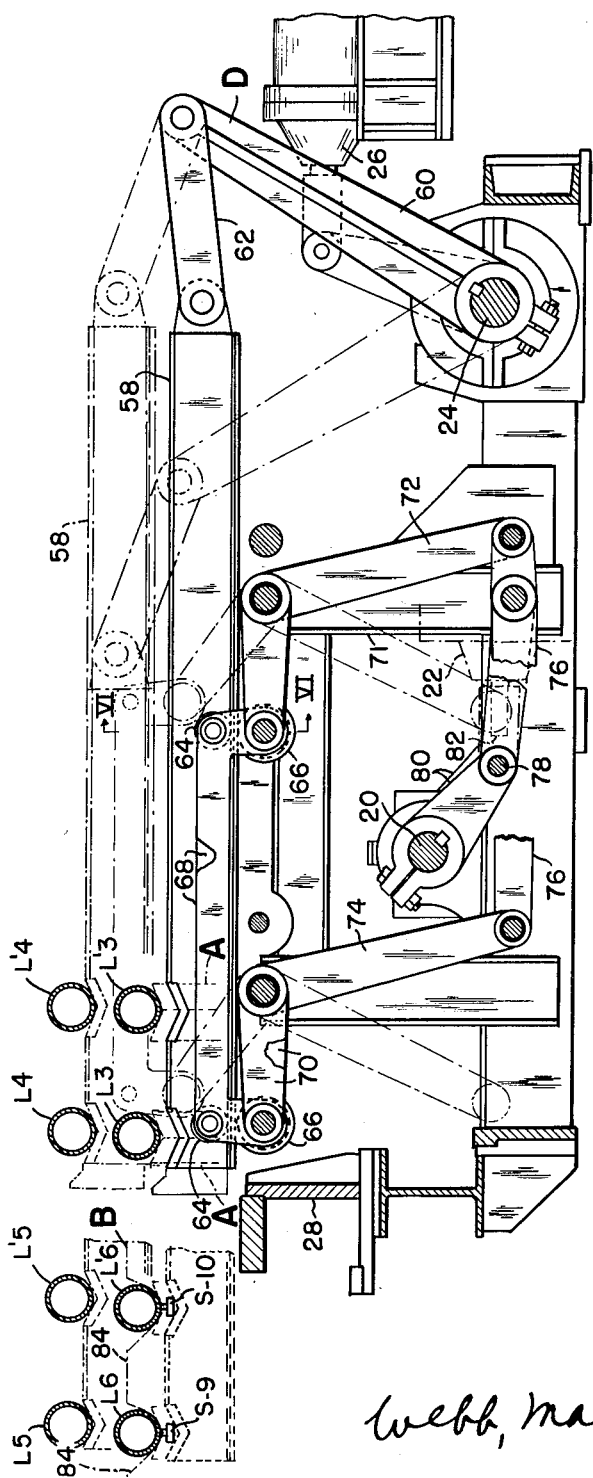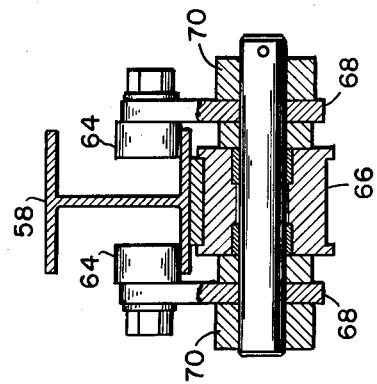

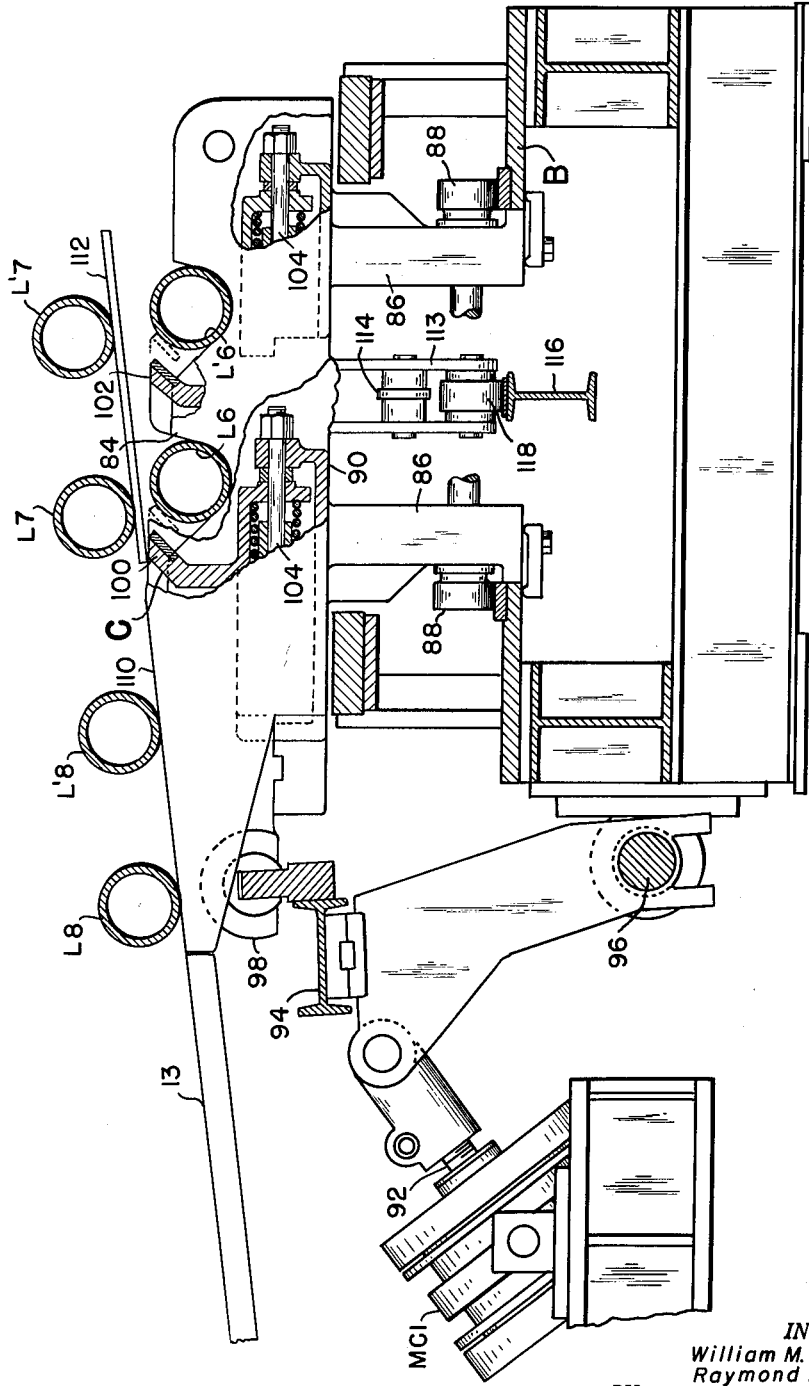

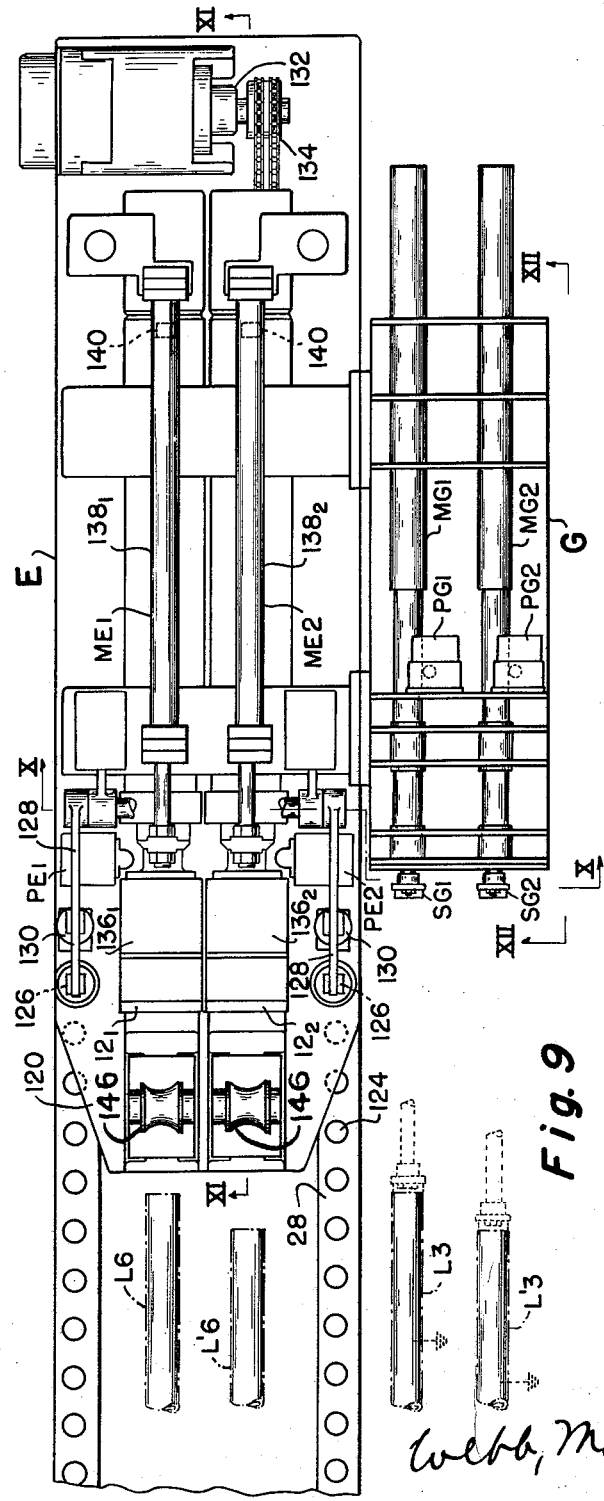
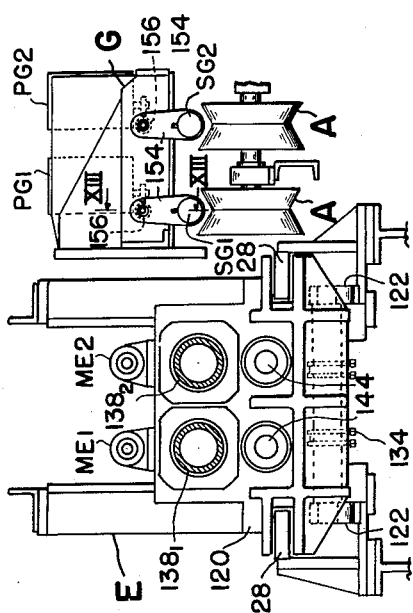
Fig. 9
Fig. 10
INVENTORS.
William M. McConnell
Raymond L. Carey
BY
Webb, Mackey & Burden
THEIR ATTORNEYS

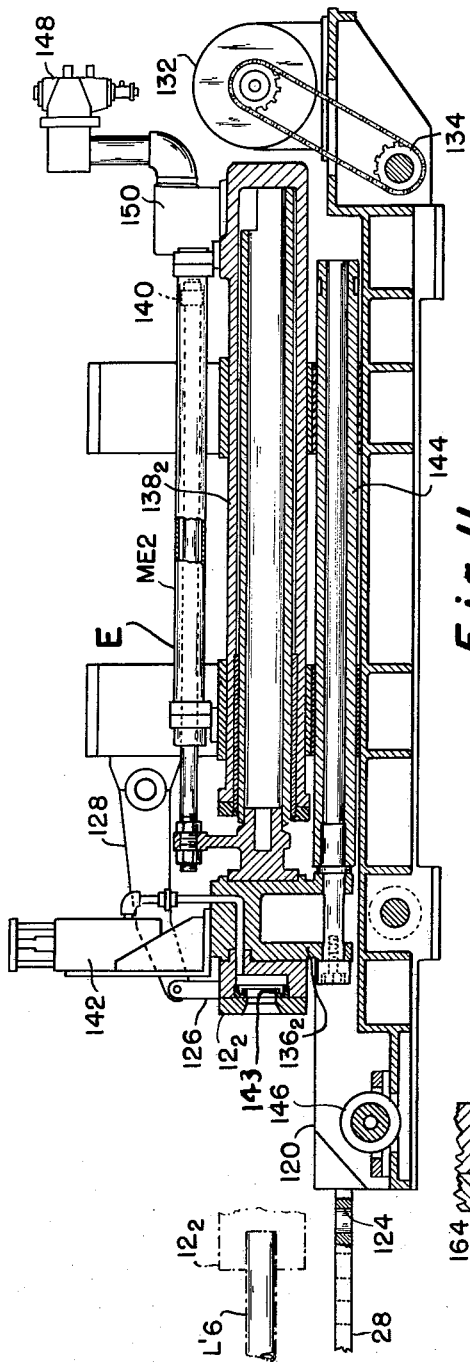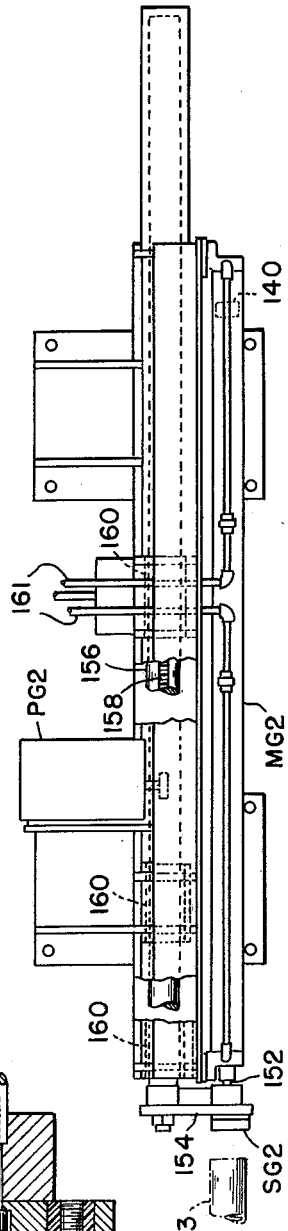
Fig. 11
Fig. 12
Fig. 13
INVENTORS.
William M. McConnell
Raymond L. Carey
BY Webb, Mackey & Burden
THEIR ATTORNEYS May 8, 1962    W. M. McCONNELL ET AL    3,033,025
DUAL PIPE TESTER
Filed March 10, 1958    11 Sheets-Sheet 11

INVENTORS.
William M. McConnell
Raymond L. Carey
BY
Webb, Mackey & Burden
THEIR ATTORNEYS United States Patent Office 3,033,025
Patented May 8, 1962

3,033,025
DUAL PIPE TESTER
William M. McConnell, McKeesport, and Raymond L. Carey, Pittsburgh, Pa., assignors to Taylor-Wilson Manufacturing Company, Pittsburgh, Pa., a corporation of Pennsylvania
Filed Mar. 10, 1958, Ser. No. 720,486
10 Claims. (Cl. 73—49.6)

This invention relates to a dual pipe tester and more particularly to hydraulic-pressure utilizing machines embodying prealignment table and test bench apparatus which, in sequence, prealign and automatically position and pressure test thereon two lengths of pipe, tubing, or the like simultaneously for leaks.

In previous machines, arrangements have been provided wherein a single length of pipe is fed between two sealing heads in a test bench receiver construction, at least one of said heads being constructed so as to be movable toward one end of a length of received pipe which has been mechanically prealigned at the opposite end by means of an alignment table construction so as to accurately accommodate to the fixed operating position of the other sealing head. In such a machine, the sealing heads can take various forms such as a flat plate or can be of a type having an outside diameter sealing arrangement wherein the pipe enters a sealing cavity in the end of the head itself. It is obviously true that the movable head must be accurately stopped in its movement of approach so as not to overtravel and buckle the length of pipe between it and the other head and various devices have been proposed for single length pipe testers whereby with appropriate switching mechanism the moving head mechanically "feels" the pipe directly or is otherwise responsive to the end location thereof to stop the movable head. However, it represents a considerable departure from these prior devices to provide appropriate end location responsive means in a compound receiver adapted for a plurality of lengths of pipe, and practical considerations of doing so mechanically impose serious problems.

As indicated, the present tester for accomplishing the foregoing follows a sequence utilizing a prealignment table and, more importantly, a dual headed receiver provided with individual head carriers which advance substantially simultaneously therefrom until their movable sealing heads precisely engage corresponding ends of pipe lengths to be concurrently tested, the movement of the movable heads being predetermined for the individual lengths and controlled automatically so that the carriers bring the heads to a dictated stop based solely upon prealignment information. Thus, according to this invention it is not only unnecessary but undesirable for the two movable sealing heads to have the further complication of being required to carry individual pipe-actuated feeler switches as above or other end detection means causing the heads to hunt after the end of the pipe to be encountered, keeping up this movement until the latter is physically detected.

In connection with the present prealignment control and its effect over the two outcoming heads, we find it highly feasible to derive information originating at the prealignment table, to store the incoming information electrically both when originating simultaneously or when originating at different times from the several sources, and thereafter to utilize it in the order needed when the pipe lengths reach the receiver. The actual pressure testing for leaks proceeds to completion in about the same time interval as already required for the one length of pipe in previous single-pipe testers and obviously the principles of the present invention can be applied to machines which will simultaneously accommodate either less or more than two pipes up to several lengths at a time, enabling this tester to have a capacity which is several-fold the output obtainable with the single length pipe testers referred to.

The present apparatus, judged for comparison's sake with an operation of like output employing several identical single-length pipe testers, affords a considerable space saving with less duplication of parts due to simultaneous handling and the consolidation of function in certain of the handling members common to the two or more lengths of pipe undergoing prealignment and testing. A pipe feeder which we provide and also the referred to prealignment table on which the fed pipe is received, handle two of the individual lengths of pipe at or about the same time and likewise a transfer beam which positions pipe in the test bed and a kick-out and clamp mechanism which we provide therein, coordinate the pipe lengths by pairs so that their motion is in concert at all points with a consequent time saving.

According to a feature of this invention, the referred to movable head mechanism hereof consists of head reciprocating means individual to each of the movable heads for the two lengths of pipe, and further the alignment table mechanism provides automatic gages individual to the pipe end locations in their prealigned positions, and the latter mechanism through a train of three potentiometers provided therein for each gage exerts a delayed electrical control effect over the head reciprocating mechanism at the right time. More specifically, operation of the first potentiometer device derives and electrically transmits a signal determined thereby in dependence on the momentary set-out position of its individual gage member, operation of the second potentiometer duplicates the transmitted operation of the first potentiometer so as to fix, in its satisfied position, an electrical quantity derived in dependence on said signal determined by the set-out position of that gage member, and operation of the third potentiometer which is mechanically positioned at al times by movement of the head reciprocating mechanism, stops the latter in its path of travel when it reaches a distance of fixed proportion to the magnitude of the fixed electrical quantity. In the use of these two independent sets of potentiometers, each operates on a different one of the individual lengths of pipe so as to keep the stored information entirely separate without chance for commingling it and they preferably operate the respective head reciprocating means simultaneously so as to save time.

Further features, objects and advantages will either be specifically pointed out or become apparent when, for a better understanding of the invention, reference is made to the following description taken in conjunction with the accompanying drawings which show a preferred embodiment hereof. In the drawings:

FIG. 4 is a side elevational view of the stand of FIG. 3;

FIG. 5 is a view in side elevation of a transfer beam stand which is viewed along the line V—V of FIG. 1 and which forms one unit in a line of such stands identical therewith;

FIG. 6 is a detail in section along the line VI—VI of FIG. 5;

FIG. 8 is a view in side elevation, partially in section, along the line VIII—VIII of FIG. 7;

FIG. 9 is a large scale showing of a portion of FIG. 2;

FIGS. 10, 11 and 12 are transverse and side elevational views along the respective lines X—X, XI—XI and XII—XII of FIG. 9 to show details of the head moving mechanism and gage mechanism;

FIG. 13 is a detail view in section taken along the line XIII—XIII of FIG. 10;

Figure 1:
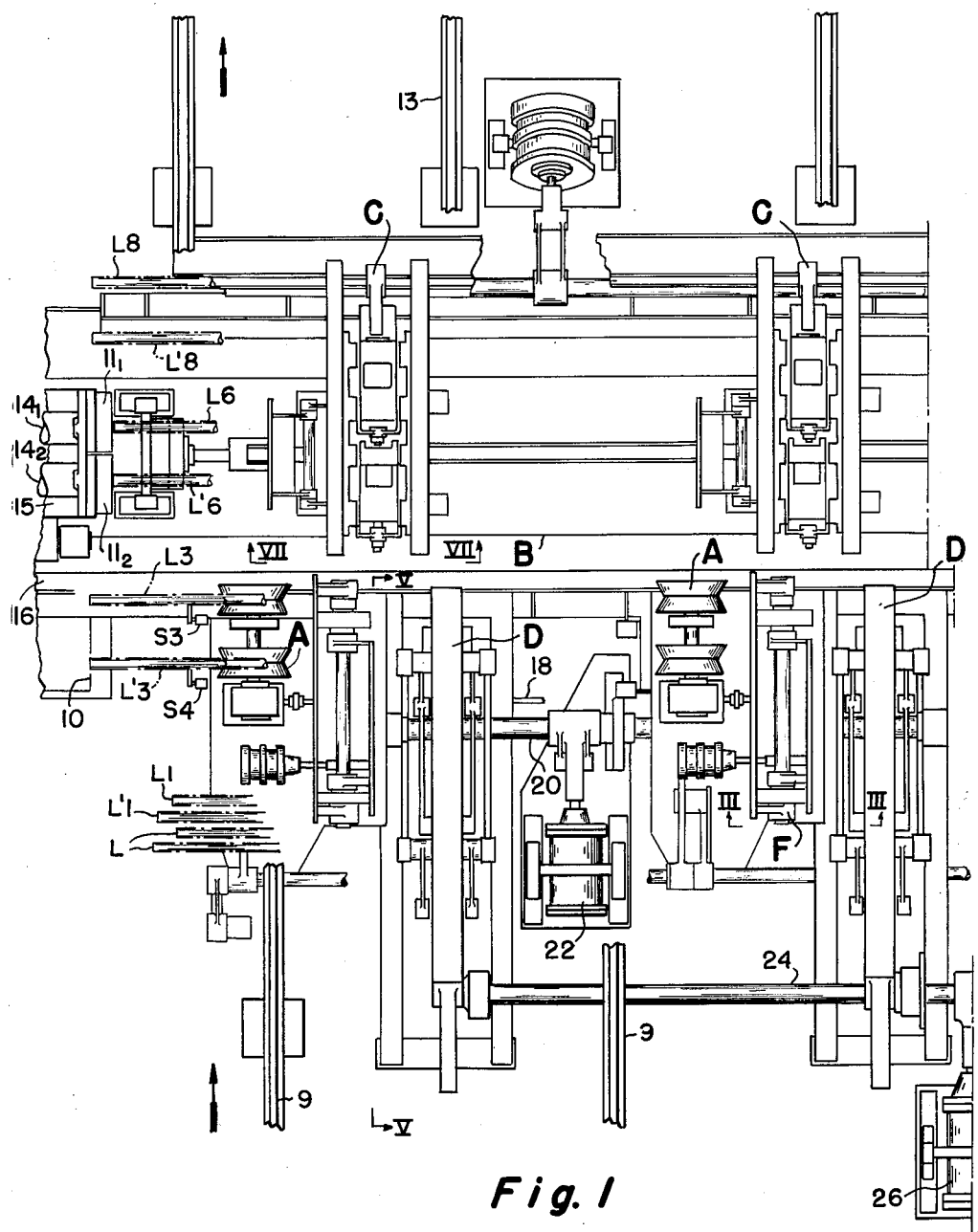
FIGURE 1 is a plan view of an automatic hydraulic tester of the present dual pipe type.
Figure 2:
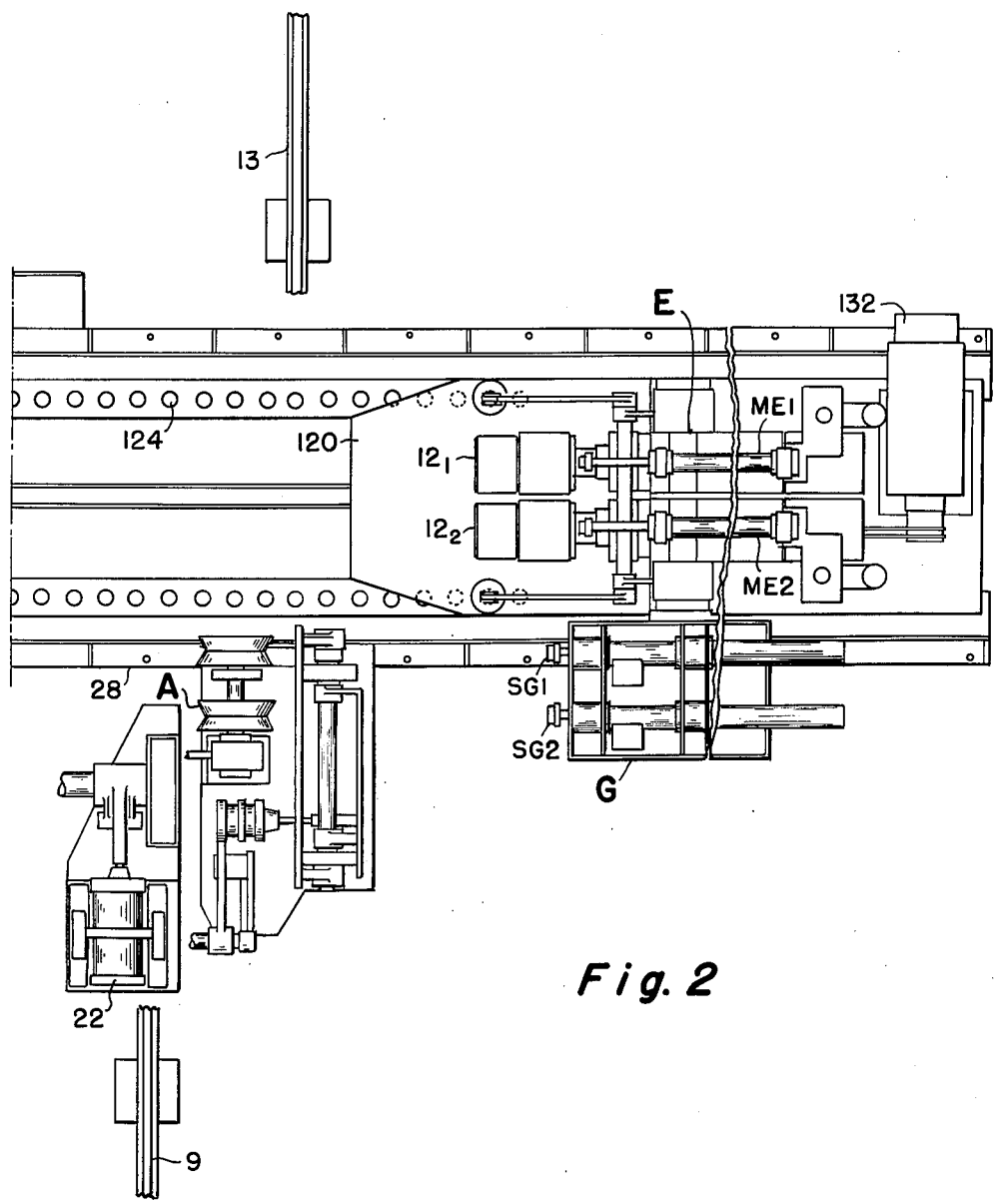
FIG. 2 is an extension of FIG. 1.

In the illustrated apparatus, lengths of pipe L with their axes mutually parallel are fed by gravity along a set of feed skids 9 to a point where they are picked off at intervals enabling two first lengths L1 and L'1 to be separately advanced and dropped each in an individual conveyor formed by alignment table rolls A at a distance transversely spaced from the other, e.g. 12 inches center to center as illustrated. The effect of the alignment table rolls A is that the lengths of pipe roll the same way endwise into the respective dotted line positions L3 and L'3 with the leading end in solid engagement with a manually adjustable pipe alignment stop 10 common thereto. So prealigned, the pipe lengths then progress in concert into their test positions L6 and L'6 in a test bench frame B having one receiver at the aligned end of the pipe lengths consisting of first and second test heads $11_1$ and $11_2$. A clamp and kick-out mechanism C operates to clamp and then to unclamp the lengths of pipe after a period and kick them out ready for being run off by gravity on a set of run-out skids 13 on which they are ultimately deposited from their leaving positions L8 and L'8 respectively.

The test heads $11_1$ and $11_2$ have hydraulic induction connections $14_1$ and $14_2$ individual thereto for supplying the usual pipe testing water and they have a receiver slide 15 common thereto consisting of a carriage slidably mounted on fixed guide rods for limited movement of the heads with respect to a frame end support 16. This limited movement of the test heads $11_1$ and $11_2$ is less than that of the opposite receiver consisting of a pair of heads $12_1$ and $12_2$ so that the latter are more commonly referred to as the movable test heads and for this purpose a movable head mechanism E which is hereinafter described is provided.

The apparatus as a whole may be many feet long and several axially aligned pieces of coupled-together power shafting are necessary to form a line drive shaft 18 which is common to the sets of alignment table rolls A and which is driven by a continuously running electric motor, not shown. The beam transfer mechanism D is provided with a first line shaft 20 having a lift function and being driven by a double-acting air cylinder 22, and further provided with a second line shaft 24 providing a traverse function and driven by a double-acting air cylinder 26.

A series of feeder stands F is arranged in alternation with the sets of alignment table rolls A and a gage mechanism G is associated with the latter adjacent the movable head mechanism E for measuring the pipe length and automatically stopping movement of the movable test heads $12_1$ and $12_2$ at a distance equal to the included lengths of the pipe. A frame end-support 28 is common to the movable head and gage mechanisms E and G.

Figure 3:
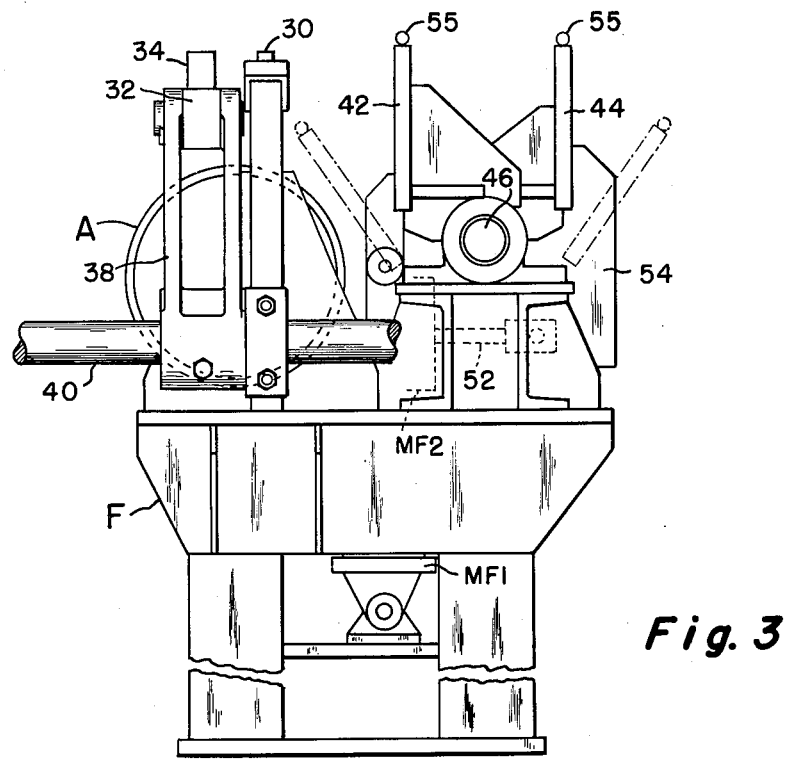
FIG. 3 is the entrance-end view, in elevation, of a dual pipe feeder stand as viewed from the line III—III of FIG. 1 and constituting one unit in a line of identical stands illustrated therewith.

The prealignment table rolls A are shown in their relationship to one of the feed stands F in FIGURES 3 and 4. The pipe lengths L are deposited on the feed skids 9 from which they roll by gravity into pickoff positions L1 and L'1 where they are supported on kick-off runners 30 each carried by a different one of the stands F. A bar plate 32 having a stop lug 34 rests on a block 36 carried by the stand F and has a pivotal connection to a lever 38 mounted on a shaft 40. Normally, the bar plate 32 is in a fixed position but it may be adjusted for pipes of different size by turning the lever 38 through appropriate rotative adjustment of the shaft 40.

A pair of long and short flipper rails 42 and 44 is provided on each feed stand F which are made of metal plate and which have a common fixed shaft 46 defining an axis 47 on which they independently revolve from their dotted line position shown in FIG. 3. For the sake of brevity, only one stand F is described and shown in detail. Leverage is first applied to the flipper rail 42 to revolve it into the elevated solid line position for raising the pipe length L1 and rolling it into a notch 48 where it occupies the position L2, and for this purpose a first double-acting feeder motor $M_{F1}$ is provided consisting of a stand-connected air cylinder and a piston 49 contained therein which is connected to a pivot bracket rigid with the rail 42. When the rail 42 is reversed and drops back to idle position enabling the second pipe length L'1 to advance to the position L1, the short flipper rail 44 is oscillated through a cycle of operation enabling it to raise and roll the second length of pipe into a notch 50 which the pipe occupies in the position L'2, and for this purpose a second double-acting feeder motor $M_{F2}$ is provided having a stand-connected air cylinder which contains a piston and a piston rod 52 (FIG. 3) which is connected to a pivot bracket 54 rigid with the short flipper rail 44. A wear rod 55 is welded at fixed angularity to the sloping upper edge of each of the flipper rails for actually contacting the pipe.

As each of the flipper rails 42 and 44 drops into its idle position, the weight of the pipe is transferred into the positions L3 and L'3 resting on the alignment table rolls A which are connected through a reduction gear box 56 to the continuously turning conveyor line shafting 18. In this manner, the pipe lengths are prealigned at one end with one another and with the test heads $11_1$ and $11_2$ of FIG. 1.

In FIGS. 5 and 6, the alignment table rolls A are shown in their relation to the adjacent test bench frame B, the transfer beam mechanism D providing the operative connection therebetween. The beam mechanism D comprises a horizontally disposed walking beam 58 of I-beam construction which, through a pitman arm 60 and a connecting rod 62 is operated by the traverse line shafting 24 which as previously indicated is drivingly connected to the double-acting air cylinder 26. The walking beam 58 runs on sets of upper and lower rollers 64 and 66 carried in fixed positions at the opposite ends of a pair of walking beam track bars 68. Sets of elevator arms 70 which are mounted to a stand 71 to swing in vertical planes are pivotally connected at the outer ends to the opposite ends of the lift track bars 68 and are made fast to separate shafts controlled by front and rear levers 72 and 74. A horizontally disposed drag link 76 connecting the lower ends of the levers 72 and 74 is operated through a pitman and connecting rod connection 78 by means of the walking beam lift line shafting 20. Another pitman arm 80 fast to the line shafting 20 is pivotally connected to a piston rod 82 provided in the double-acting air cylinder 22.

Actuation of the air cylinder 22 at the outset of a walking beam cycle rotates the front and rear levers 72 and 74 into the dotted line positions shown and as the elevator arms elevate the walking beam 58 the weight of the prealigned pipe lengths L3 and L'3 is transferred to the latter and they rise therewith into the respective horizontal positions L4 and L'4 in an elevated plane.

While in its elevated plane the walking beam 58 receives a thrust from the link 62 located at its overhanging end extending toward the motor 26, and it traverses laterally so as to overhang the corresponding opposite end of the track rails 68 thereby holding the pipe lengths in the advanced elevated positions L5 and L'5. Reversing the air cylinders 22 and 26 causes the walking beam to undergo movement to and within a lower horizontal plane enabling the weight of the pipe to transfer into the positions L6 and L'6 supported in notches on test bench plates 84 in the test bench frame B. According to its composite motion of FIGURE 5, the walking beam 58 is restored primarily downwardly at first and horizontally rearwardly to its idle position shown in solid lines, the motors 22 and 26 being conjointly operated for this purpose through solenoid valves and a walking beam down relay WBD not appearing in this figure.

Figure 7:
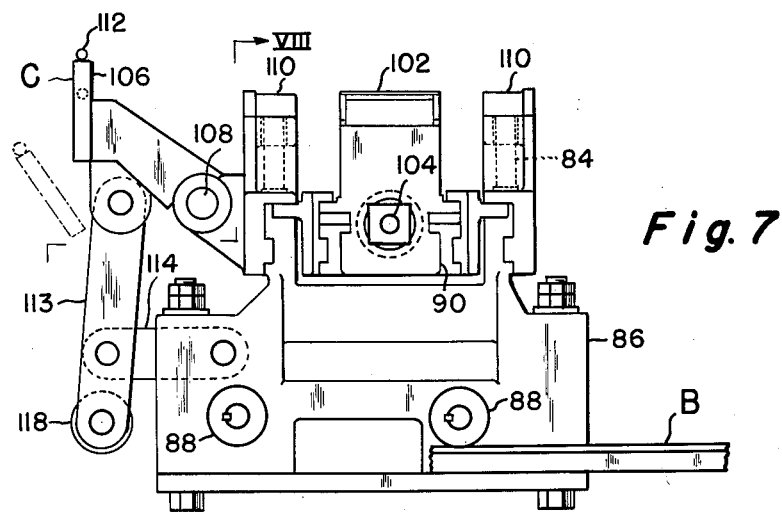
FIG. 7 is the entrance-end view in elevation of a test bench stand as viewed from the line VII—VII of FIG. 1 and which forming part of a line of such stands identical therewith.

In FIGURE 7 and 8, the clamp and kick-out mechanism C is shown in its relation to the test bench frame B generally and to the test bench plates 84 supported thereon. The latter plates 84 are rigid with a unit carriage 86 carrying rollers 88 for rolling axially along the test bench frame B. The clamp construction per se compromises a slide 90 mounted to the top of the unit carriage 86 so as to reciprocate in response to operation of a double-acting motor structure $M_{C1}$ consisting of a trunnion-mounted air cylinder and a pitman-connected piston rod 92 contained therein. A heavy pitman structure 94 operated by the piston rod 92 is mounted to pivot at its lower end on a fixed shaft 96 and has an upstanding articulated connection 98 to the slide 90. A pair of spring loaded clamping jaws 100 and 102 is provided having tie rod connections 104 at separate points to the slide 90 making them capable of limited relative movement and enabling them to distribute the load when brought into biased engagement with the lengths of pipe L6 and L'6 within the notches of the test bench plates 84.

A flipper rail 106 is mounted to revolve on a pivot shaft 108 (FIG. 7) defining a fixed, laterally offset axis so as to encroach upon the pipe in their path from beneath the positions L6 and L'6. Movement of the flipper rail 106 from the idle, dotted line position into its elevated position shown in solid lines, raises the pipe lengths into their positions L7 and L'7 and they thereupon roll so as to pass by gravity through the leaving positions L8 and L'8 on a ramp 110 in their path. A wear rod 112 is welded at fixed angularity to the sloping upper edge of the rail 106 and the slightly sloping plane of the ramp 110 merges with the plane of the run-out skids 13. Leverage is applied to the flipper rail 106 by a leverage system including a vertically disposed lift link 113, a guide link 114 therefor which is pivoted to the carriage 86, and a motor-operated lift beam 116 which engages a roller follower 118 connected to the lower end of the lift link 113.

Actuation of the clamp motor $M_{C1}$ in a direction to rotate the pitman structure 94 clockwise as viewed in FIG. 8 causes the clamps 100 and 102 to advance into the dotted line position shown where they firmly anchor the pipe for leak testing. Reversal of the motor $M_{C1}$ following the test releases the clamps 100 and 102 and thereafter the lift beam 116 is motor actuated to bring the flipper rails 106 into their elevated pipe-lifting position where, after suitable rolling movement of advance of the tested pipe into its leaving position, they are returned to the idle position shown in dotted lines in FIG. 7.

In FIGS. 9 and 10, the movable head mechanism E is shown in its relation to the gage mechanism G, both of which are mounted on the frame end support of which a rail portion is indicated at 28. A locked carrier means common to the two movable heads $12_1$ and $12_2$ is provided comprising a carriage 120 carrying rollers 122 for rolling movement along the frame end support 28. Spaced locking openings 124 in the rail portion of the frame 28 receive anchor pins 126 which are carried by vertically swinging arms 128 disposed one at each side of the carriage 120. A double-acting air cylinder 130 is pivotally connected between the carriage 120 and each of the arms 128 which when extended raise the anchor pins enabling the carriage to be shifted longitudinally and relocked. The carriage 120 carries at the rear a drive motor 132 which is connected by chains and sprockets 134 and by further interconnected chains and sprockets to both axles to which the rollers 122 are affixed to provide a four wheel drive.

Second carrier means individual to the movable test heads $12_1$ and $12_2$ are provided consisting of internally passaged carrier blocks $136_1$ and $136_2$ which individually support suitable air-purge valving not shown in these particular figures and which are supported by first and second hydraulic ram and cylinders $138_1$ and $138_2$. Double-acting set-out motors $M_{E1}$ and $M_{E2}$ are provided for the carrier blocks each consisting of an air cylinder rigid with the carriage 120 and a block-connected piston 140 which is moved by pressure therein for shifting the test head.

The gage mechanism G includes first and second contact plates $S_{G1}$ and $S_{G2}$, acting as finder switches which become current conducting means when they ground themselves on the ends of the respective pipe in the positions L3 and L'3 in FIG. 9. These contact plates are reciprocated in a path in line with the respective alignment table rolls A by means of first and second double-acting motors $M_{G1}$ and $M_{G2}$ each comprising an air cylinder and piston construction.

In the interests of brevity only that portion of the movable head mechanism E which operates the second movable head $12_2$ is shown in FIG. 11 and described in connection therewith. The ram in the second hydraulic cylinder $138_2$ is rigid with the carrier block $136_2$. This carrier block suports one component of the air-purge valving, just referred to, and which as generally indicated at 142 is connected to communicate with the carrier block passages. The sealing heads can be of the flat plate form previously mentioned or if desired can conform to an inside diameter sealing arrangement or else to the outside diameter sealing arrangement. In the illustrated case of FIGURE 11 a seal 143 in the head provides an outside diameter sealing arrangement as referred to wherein the pipe enters a sealing cavity in the end of the head itself. A piston rod fastened to piston 140 of the set-out motor $M_{E2}$ is rigid with the block $136_2$ and similarly a hollow rack bar 144 is made rigid with the latter and in its extended positions runs on a grooved roller 146 which is supported to turn on a fixed axis within the carriage 120.

In operation, the double-acting set-out motor $M_{E2}$ is air operated to advance the sealing head $12_2$ into the dotted line position shown, covering the end of the pipe length L'6 and simultaneously hydraulic fluid is admitted to fill the cylinder $138_2$ through a blocking valve 148 and a suitable anti-surge valve 150. The blocking valve 148 is then closed in suitable fashion which traps the previously admitted fluid behind the cylinder $138_2$ and thereafter when the motor $M_{E2}$ is reversed the head $12_2$ remains hydraulically locked in its advanced position until the leak test is completed and the blocking valve 148 opened.

In the interest of brevity, only the portion of the gage mechanism G for operating the second contact plate $S_{G2}$ is shown and described in connection with FIGS. 12 and 13. The piston 140 in the second gage motor $M_{G2}$ carries a piston rod 152 within the air cylinder which at its external end is rigid with a carrier head 154. A rack bar 156 made fast at one end to the head 154 and carrying a set of rack teeth 158 in the side thereof is slidably mounted within bearings at suitably indicated locations 160 along the length thereof. Air under pressure is selectively supplied to the ends of the air cylinder through pipes 161 for moving out the contact plate $S_{G2}$ to hunt after the appropriate end of the pipe length L'3 and at the instant of contact it forms a ground for an electric binding terminal 162 so as to operate a transformer circuit connected thereto as hereinafter more fully described. The contact plate $S_{G2}$ has a thick insulating layer 164 of nylon between it and the head 154 and is rigidly clamped thereto by means of a series of insulated bolts 166.

The present tester comprises various potentiometer and switch components for controlling the different operations above noted. The operation and function of these components will be described briefly and thereafter a more detailed description of the sequential operation of the tester will be given.

*Potentiometers $P_{G1}$ and $P_{G2}$.*—These potentiometers are mounted on the gage mechanism G according to FIGS. 9 and 12 so as to have a rack and pinion connection to different rack bars 156 and they are operated by the rack teeth 158 thereof as they travel past. One suitable form is a "Helio pot type CL" transmitter manufactured by Clark Controller Company. Its function is to derive and transmit an electrical potential in dependence on the momentary set-out position of the associated contact plate and it is energized from a 30 v. source of direct voltage.

*Potentiometers $P_{E1}$ and $P_{E2}$.*—These potentiometers are mounted to the movable head mechanism E according to FIG. 9 so as to have a rack and pinion connection with different rack bars 144, and they are operated when these rack bars move out and back drawing their rack teeth therepast. One suitable form is a "Helio pot" receiver of the same general type as the transmitter above referred to. Its function is in conjunction with those transmitters and controls the head reciprocating mechanism E so as to stop each head in its path of travel at a distance derived proportionately to the transmitted electrical potential and for its operation the receiver potentiometer requires a 30 volt D.C. source.

*Switches S3 and S4.*—These switches which include both normally open and normally closed sets of contacts are mounted in line with the alignment table rolls A according to FIG. 4 and they are operated by the pipe lengths reaching their alignment table positions L2 and L′2. Among other results, the feeder flipper rails 42 with simultaneous collateral movement drop from their elevated position in response to the pipe-tripped switch S3 so as to expeditiously complete one cycle and stay idle in readiness for the next. The pipe-tripped switch S4 similarly operates the short flipper rails 44 shown in FIGURE 4.

*Switches S9 and S10.*—These switches are mounted in line with the notched bottoms of test bench plates 84 according to FIG. 5 and are pipe-actuated when the respective lengths of pipe move downwardly from their positions L5 and L′5 for testing. Their function, which amounts to a precautionary measure requiring that they both be in closed position, is to sense the fact of pipe being deposited on the test bench frame to insure against it being partially or wholly empty at time when the clamps and head set-out mechanism initiate their operation.

Figure 14:
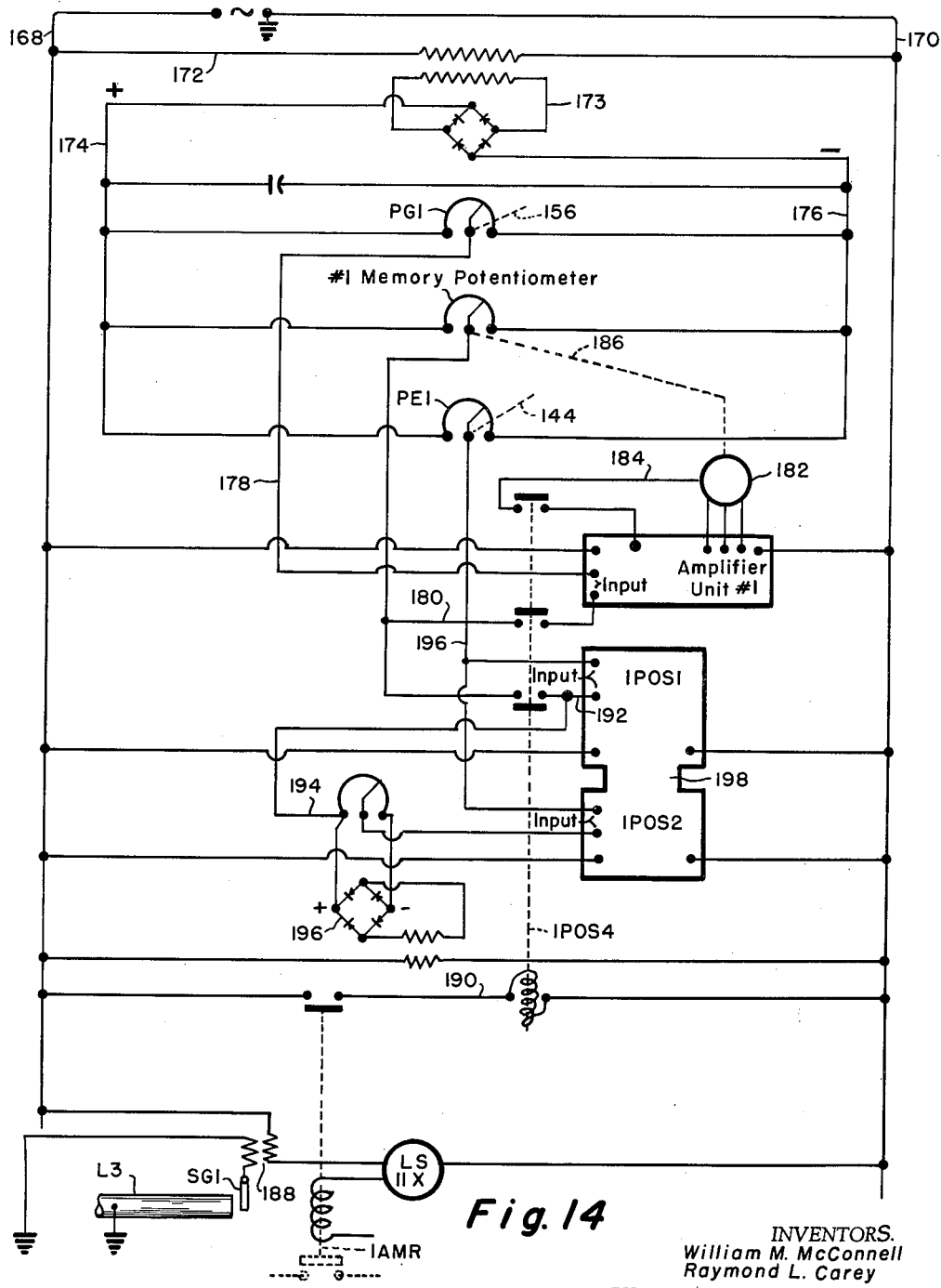
FIG. 14 is a schematic diagram of the potentiometer and relay arrangement for operating the movable head control mechanism of FIGS. 10–12.

Following is an example of the circuits and operations for carrying out the sequence of detecting the pipe end location by said gage mechanism G and then electrically deriving and storing that location information for use in subsequent control of the movable head mechanism E, reference being had to FIG. 14. Two A.C. line conductors 168 and 170 have a branch circuit 172 thereacross which is coupled by means of a transformer and a rectifier 173 to a pair of D.C. line conductors 174 and 176.

The transmitter potentiometer $P_{G1}$, which is mechanically driven by the rack bar 156 associated with the contact plate $S_{G1}$, is connected across the D.C. lines 174 and 176 and in the interests of brevity, only the portion of the gage mechanism G circuits will be described which relate to that contact plate and the head set-out motor $M_{E1}$. The slider voltage of the potentiometer $P_{G1}$ through a connection 178 is impressed upon one voltage comparison terminal on the input side of an Amplifier Unit marked #1 in FIG. 14. By means of an upper conductor branch 180, the slider voltage from a Memory Potentiometer separately indicated at #1 on the drawing is impressed on another voltage comparison terminal on Amplifier Unit #1 which measures and amplifies the resulting input differential voltage. Amplifier Unit #1 supplies current to a potentiometer setting motor 182 which it controls in accordance with that voltage through a winding branch 184 and which is mechanically connected at 186 to position the slider on Memory Potentiometer #1. This Memory Potentiometer #1 is located on a remote control panel, not shown, and the Amplifier Unit #1 and the setting motor 182 operate the Memory Potentiometer in the manner of servo-mechanism which in satisfied position reduces the differential voltage to zero at the input side of Amplifier Unit #1. The follow-up response of this mechanism is practically instantaneous amounting to approximately ¼ second lag or 1 second at the most.

A relay LS11X appearing in the lower portion of FIG. 14 is connected across the A.C. lines 168 and 170 in a branch circuit therebetween which includes the high impedance primary winding of a control transformer 188. The secondary winding of this type of control transformer 188 is arranged in known manner requiring the coils thereof to be shorted out before the primary can conduct effectively. Thus, when the contact plate $S_{G1}$ grounds out upon the pipe length L3, the secondary coils are shorted so that the primary winding of the transformer 188 conducts and energizes the relay LS11X which, through another relay 1AMR after suitable delay, closes a circuit 190 to energize a positioning relay 1POS4. The energized relay 1POS4 has a series of contacts arranged so that operation of one set open-circuits the motor control winding branch 184 so as to stop the potentiometer setting motor 182; operation of another set open-circuits the upper conductor branch 180 so as to discontinue the slider voltage input from Memory Potentiometer #1 to Amplifier Unit #1; and operation of a further set closes a middle conductor branch 192 and a lower conductor branch 194 leading from the slider of the Memory Potentiometer #1. Accordingly, by means of branch 192 the full slider voltage is transferred and impressed upon one voltage comparison terminal of a normally energized electronic relay 1POS1 whereas the same slider voltage from Memory Potentiometer #1 is divided in the lower conductor branch 194 and applied to one voltage comparison terminal on the input side of another normally energized electronic relay 1POS2. The remainder of the voltage comparison terminals of the electronic relays 1POS1 and 1POS2 are impressed with the slider voltage communicated by a conductor 196 which is connected to the slider of the receiver potentiometer $P_{E1}$. The receiver potentiometer $P_{E1}$ is connected across D.C. lines 174 and 176 and is mechanically driven by the rack bar 144 which according to FIG. 10 moves in concert with the set-out motor $M_{E1}$ in the movable head mechanism E.

As the rack bar 144 moves the receiver potentiometer $P_{E1}$ to a point where the differential voltage on the input side of the electronic relay 1POS2 reduces to a small value, this relay is deenergized. It is adjusted so as to drop out prior to the other relay 1POS1 due to the fact that the power supply 196 to an adjustable voltage divider included in the lower branch 194 is so arranged as to keep the differential voltage from registering as high as the differential voltage impressed on relay 1POS1. Subsequently, when zero differential voltage appears across the input terminals of the relay 1POS1, this relay also deenergizes and the two relays share a common amplifier portion 198 having good sensitivity and bias control enabling them to be very sensitively adjusted to the differential voltages. The respective relays 1POS2 and 1POS1 drop out in the stated sequence to control the slowdown and accurate stopping of the set-out motor $M_{E1}$ in the movable head mechanism E in a manner more fully set forth hereinafter. It is apparent that, through the addition of a further electronic relay and amplifier (not shown) of the foregoing type, the user can with slight modification further utilize the electrical output from the #1 Memory Potentiometer to also control the set-out motor $M_{E1}$ in its retractive stroke. This modification is a waste-motion preventer obviously not interfering with the movable head retracting a distance sufficiently clear of the end of the pipe just tested but enabling it to retract and stop only a predetermined distance beyond the adjacent end of the next pipe to be tested provided it is longer than the pipe length just tested.

The pipe handling mechanism of the tester of preceding FIGS. 1–14 has an actuating control therefor including pluralities of suitable interlock switches, not shown, certain ones of which are preferably provided behind the receiver slide 15 for the test heads at one end and behind each of the test heads $12_1$ and $12_2$ on the carriage 120 at the opposite end to sense the fact each time that all heads have reset in the required way into fully retracted positions. The completion of each walking beam cycle wherein it remains idle in the solid line position 58 of FIG. 5 is a key point in the handling operation, being as it indicates that the first lengths of pipe occupy the positions L6 and L'6 in which they are clamped ready for testing and further indicative that the empty alignment conveyor rolls A are available for the second lengths of pipe to be fed thereto for prealignment into the positions L3 and L'3. At this key point therefore, a feed operation is in order for the feeder F to feed those second lengths of pipe onto the alignment table rolls A and also the operation of that portion of the gage mechanism G is brought about for obtaining the pipe end location measurement. Additionally at this point, the test heads $11_1$, $11_2$, $12_1$ and $12_2$ take their moved-out position in which they cover the respective ends of the pipe lengths L6 and L'6.

The following sequence of operations is then carried out in conventional way to perform the actual testing operation on the pipe lengths for leaks. Water is introduced through the induction connections $14_1$ and $14_2$ of FIG. 1 by appropriate operation of fill valving, not shown, and facilitated through the operation of suitable purge valving of the general type indicated at 142 of FIG. 11 to rid the pipe interiors of air. Pressure on the water in the filled pipes is increased upon operation of appropriate intensifier valving, not shown, and the present apparatus is capable of introducing test pressures for leakage in the amount of 3,500 p.s.i. into pipe of a size ranging between 20' and 35' long and between 2¾" and 4½" outside diameter. The mill tolerance on pipe of this size allows for a variation of four feet between the lengths of maximum and minimum pieces and, accordingly, the set-out stroke of the motors $M_{E1}$ and $M_{E2}$ preferably produces five feet of travel to accommodate this tolerance. For greater lengths of stroke which may be desired in some cases, a waste-motion preventer of the type referred to is desirable in controlling retraction of the motors $M_{E1}$ and $M_{E2}$ to a point accommodative of the next fresh length of pipe.

Figure 15:
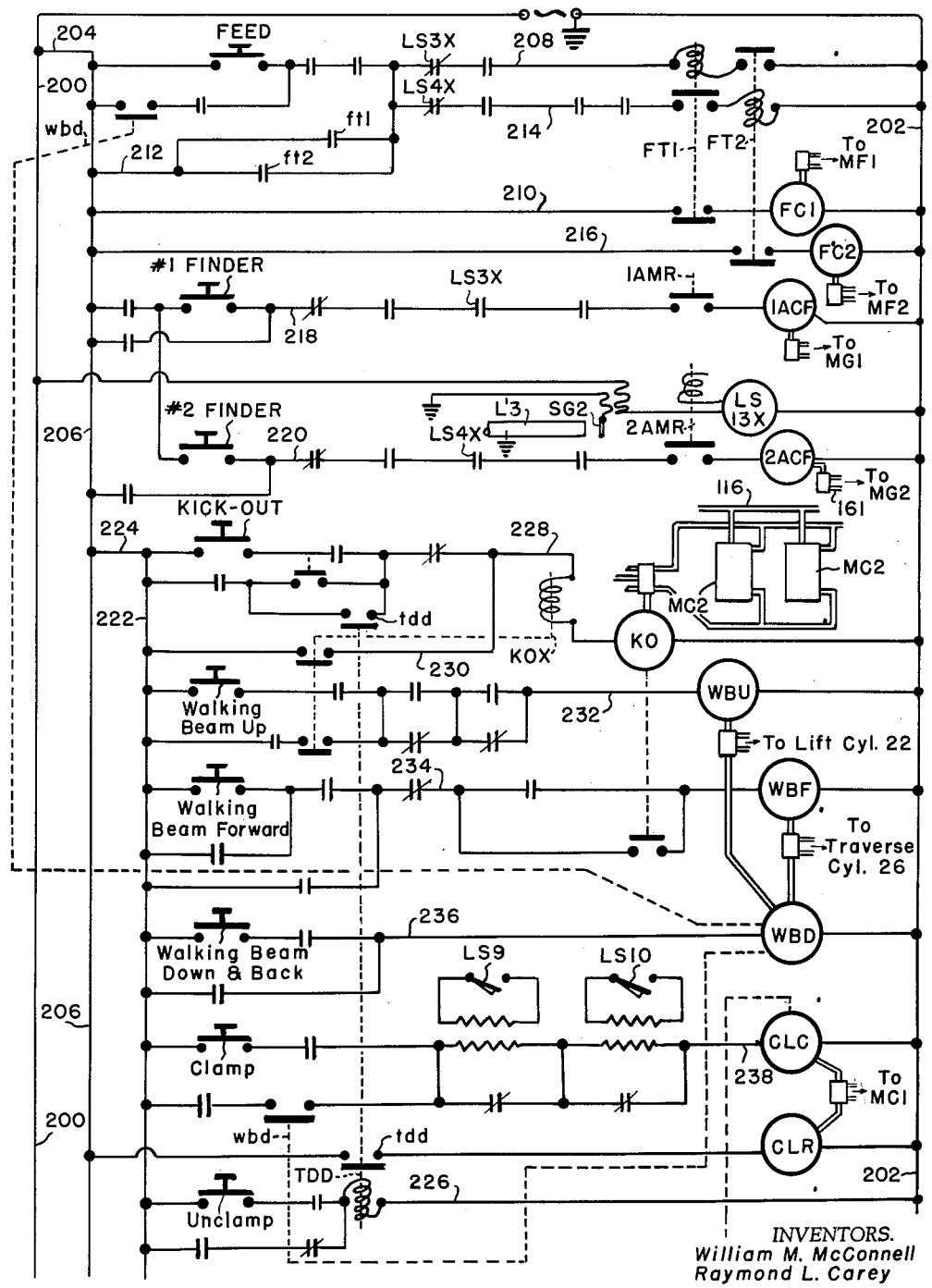
FIG. 15 is a schematic diagram illustrating one form of control system for the overall apparatus.
Figure 16:
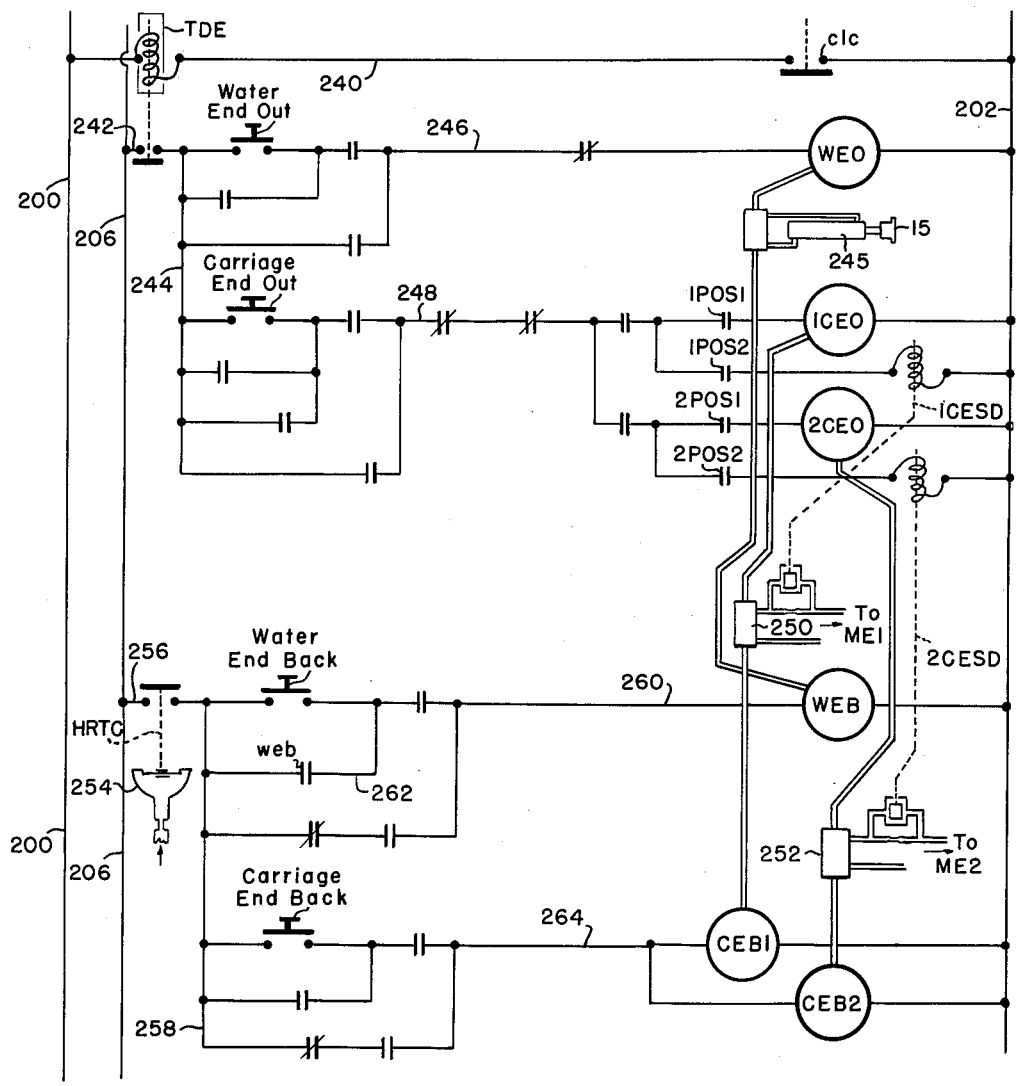
FIG. 16 is an extension of FIG. 15.

A specific example of the manner in which the referred to actuating control can be connected in circuit is illustrated in FIGS. 15 and 16, FIG. 16 being an extension of FIG. 15. For purposes of clarity, the illustrated diagram is executed in conventional manner of schematically showing control and power circuits, the solenoids in large part not being shown mechanically connected to the solenoid switch contacts or relay switch contacts operated thereby; the solenoids or relay operators being indicated by capital letters and the switch contacts operated thereby being shown by corresponding small letters and the appropriate subscripts. Switches which are normally closed have a diagonal line extending across the symbol. The walking beam 58 is assumed to have deposited the first set of pipe lengths in the positions L6 and L'6 on the test bench frame B, thereby completing its first cyclic movement into the idle position.

A pair of energized line conductors 200 and 202 have a circuit connection 204 intermediate thereof which may be switch-controlled and which supplies current from the conductor 200 to a second line conductor 206. A circuit 208 connected between the conductor lines 202 and 206 includes the winding of a feed relay $F_{T1}$ and further includes various interlock and control switches for the circuit, the most active of which comprises a set of flipper rail reversing switch contacts LS3X corresponding to alignment table switch S3 previously referred to and which disables the circuit 208 whenever and as long as the alignment table rolls A are occupied by a pipe length L3. The circuit 208 is manually operable to actuate the relay $F_{T1}$ by means of a Feed switch as indicated but preferably is automatically operated by the contacts $wbd$ whenever the referred to walking beam down relay WBD is energized to move the walking beam into its idle position.

Actuation of the relay $F_{T1}$ closes a circuit 210 to energize a feed contactor $F_{C1}$ which through an appropriate solenoid valve causes the first feed motor $M_{F1}$ to elevate one series of flipper rails in the feeder stands F. Suitable holding contacts $ft1$ from the relay $F_{T1}$ form a holding circuit 212 therefor. A length of pipe L1 thereupon rolls along the elevated rails into the notch 48 shown in FIG. 4 so as to open the referred to switch LS3X thereby causing the relay $F_{T1}$ to drop out, thus simultaneously denergizing the circuit 210 and the first feed motor $M_{F1}$ and closing a circuit 214 so as to energize a relay $F_{T2}$, whereupon the holding circuit 212 is again actuated. Actuation of the relay $F_{T2}$ completes a circuit 216 to energize the second feed motor $M_{F2}$ through a feed contactor $F_{C2}$ and this motor holds the other series of feed rails in an elevated position until a switch LS4X, corresponding to the switch S4 previously referred to, is tripped by pipe at position L'3 in the notch 50 shown in FIG. 4 so as to cause the relay $F_{T2}$ to drop out. Thus, the circuit 216 is opened and the final series of feeder rails is likewise restored to idle position.

Another switch LS3X, corresponding to switch S3, is included in a circuit 218 which is brought into operation either automatically or by an operator-operated Finder switch #1 and which further includes a relay 1ACF which through a suitable solenoid valve is connected to operate the first gage motor $M_{G1}$. The relay 1AMR previously noted in connection with FIG. 14 provides a lower set of disabling contacts in the circuit 218 to reverse the first motor $M_{G1}$ and reset the gage immediately the contact plate $S_{G1}$ contacts the end of the pipe length L3 being sought. A circuit 220 is similarly controlled by a switch LS4X corresponding to the switch S4 to operate the second gage motor $M_{G2}$. In like manner the second contact plate $S_{G2}$ finds the pipe length L'3 being sought whereupon a relay LS13X operates a relay 2AMR which after suitable time delay reverses the second gage motor $M_{G2}$ to reset its gage to fully retracted position.

Before considering another operation activated by the walking beam in assuming its idle position, namely the head set-out operation, it is convenient first to consider the sequence causing the walking beam to perform a cycle. Another portion of the actuating control circuit for the handling mechanism referred to is indicated at 222 in FIG. 15 and is connected to the line conductor 206 by means of an energizing circuit 224 which includes the head-actuated switches also referred to and which are not shown although as indicated they operate when the test heads $11_1$, $11_2$, $12_1$ and $12_2$ collectively have reset into fully retracted position. At that point at which we can assume the pipe test completed and that clamp motor $M_{C1}$ is still fully advanced, the branch that is first to operate in the thus-energized, actuating control circuit 222 is the lowermost branch 226 which operates a time delay relay TDD. After a pre-set delay interval, a lower set of the time delay relay contacts $tdd$ closes a circuit thereadjacent to energize a reset relay CLR which through a solenoid valve reverses the clamp motor $M_{C1}$ to unclamp the pipe in the test bench frame B; an upper set of time delay relay contacts $tdd$ closes a kick-out circuit branch 228 which through a main kick-out relay KO, a solenoid valve, and one or more air cylinders motors $M_{C2}$, operates the lift beam 116 in an upward direction in the clamp and kick-out mechanism shown in FIG. 8. Thus, the test bench frame B is emptied of the tested pipe and stands ready to receive the prealigned next lengths, i.e. prealigned at one end only adjacent the limited travel heads $11_1$ and $11_2$.

A companion kick-out relay KOX simultaneously operates a holding circuit 230 for the branch 228 and simultaneously operates another branch 232 containing a relay WBU. The relay WBU through a solenoid valve operates the double-acting lift cylinder 22 to raise the walking beam 58 into the elevated position for movement in the horizontal plane desired. Besides the walking beam control branch 232, there is a walking beam forward branch 234 which through a relay WBF operates a solenoid connected to the traverse cylinder 26 and another branch 236 which contains the walking beam back and down relay WBD, this latter relay already being referred to and sharing the motor control solenoids operated by the respective relays WBU and WBF. In addition to the usual manual Forward switch and manual Down and Back switch indicated, other switches not shown are found desirable in the walking beam control branches 234 and 236. For instance, suitable operating switches can be provided firstly in the branch 234 to move the walking beam through an advance stroke immediately it assumes its position in the elevated plane ready for traverse movement and provided secondly in the branch 236 to energize the relay WBD and make the walking beam proceed back and down to idle position immediately it has reached full advance when traversing in the elevated position.

The relay WBD in the actuating control circuit branch 236 controls the relay contacts *wbd* previously considered in connection with the circuit 208 in the top portion of FIG. 15. A further set of the relay contacts *wbd* operates when the relay WBD is energized to close a circuit branch 238 in the bottom portion of the actuating control circuit 222. Thus when the walking beam is returned downwardly to its idle position, a clamp relay CLC in branch 238 becomes energized and through a solenoid valve operates the clamp motor $M_{C1}$ in the clamp and kick-out mechanism C. The latter relay has plural contacts of which one set, not shown, open circuits the kick-out circuit 228 thereby rendering its holding circuit branch 230 disabled until the next cycle.

With the kick-out rails being dropped thusly from their elevated position, this circuit 238 is soon prepared for operation by the closure of interlock switches LS9 and LS10 corresponding to the pipe-actuated, test branch switches S9 and S10 previously considered. The empty test bench is replenished with further prealigned pipe for testing by means of the walking beam 58 as outlined.

Finally in the stated manner the walking beam contacts *wbd* complete that circuit 238 to restart another cycle of the handling operation.

The handling operation automatically continues to repeat, except for the single interruption partway through providing for a leak test cycle to intervene.

For purposes of the leak test, the clamp relay CLC also has a set of contacts *clc* which is illustrated and which is actuated thereby to close a circuit 240 and energize a time delay relay TDE which, after a suitable interval closes a conductor 242 forming a connection between a test head actuating circuit 244 and the line conductor 206.

A circuit branch 246 for moving the receiver slide 15 and its water supplied heads $11_1$ and $11_2$ outwardly is connected into the actuating control circuit 244 and operates through relay WEO, an appropriate solenoid valve, and an hydraulic cylinder and ram 245 to move the receiver slide 15 forwardly. A suitable limit switch, not shown, can be located in a position to stop the receiver slide 15 by interrupting the branch 246 following limited travel predetermined for the water-supplied heads $11_1$ and $11_2$. Another branch 248 for simultaneously causing outward movement of the movable heads $12_1$ and $12_2$ on the carriage 120 is connected into the actuating control circuit 244. This branch supplies current to the respective End Out relays 1CEO and 2CEO which through appropriate solenoid valving 250 and 252 actuate the first and second set-out motors $M_{E1}$ and $M_{E2}$ to advance their respective test heads. The branch 248 also supplies current to first and second slow-down relays 1CESD and 2CESD which when deenergized divert the set-out air supply into a more restricted air path which is provided for the set-out motors $M_{E1}$ and $M_{E2}$ to slow down movement of the test heads $12_1$ and $12_2$. Deenergization of these relays 1CESD and 2CESD is caused respectively when the electronic relay switch 1POS2 drops out in the sequence described in connection with FIG. 14 preceding, and when a corresponding electronic switch 2POS2 drops out which has a similar sequence in controlling slow-down operation of the second set-out motor $M_{E2}$.

The End Out relays 1CEO and 2CEO are controlled by the electronic relays 1POS1 and 2POS1 which are included in the circuit 248 as indicated. They drop out of circuit to stop the heads $12_1$ and $12_2$ solely on basis of prealignment information stored in the gage mechanism G.

Following each water test sequence for leakage of the dual pipe lengths, a pressure switch 254 which senses the release of the pressure within the pipes, operates after suitable time delay through a head-return, time-controlled connection HRTC to close a circuit 256 forming a connection between an actuating control circuit 258 and the line conductor 206.

A circuit 260 for reversing the ram and cylinder 245 controlling the receiver slide 15 forms one of the branches contained in the actuating control circuit 258 and contains a solenoid-valve operating relay WEB and a suitable holding circuit 262 operated by a contact *web* of the latter. A suitable limit switch can be inserted in the circuit 260 operable for deenergizing the relay WEB enabling its referred to solenoid valve to recenter itself immediately the receiver 15 is reset in fully retracted position, thereby stopping the ram and cylinder 245 automatically when reset into fully retracted position.

Another branch 264 is contained in the actuating control circuit 258 which through the relays CEB1 and CEB2 operates the respective valving 250 and 252 to reverse the first and second set-out motors $M_{E1}$ and $M_{E2}$. Suitable limit switches, not shown, can be provided for interrupting the circuit 264 immediately the movable test heads $12_1$ and $12_2$ carried by these motors have been reset through a full retractive stroke, thus terminating a complete test cycle of operation for pipe leakage.

The operation is then repeated each time the handling cycle reaches its interruption point, i.e. upon elapse of the timed interval immediately following the pipe clamping operation of circuit branch 238.

It is evident that the various anti-cycling and automatic selection and interlock switches illustrated in detail in FIGS. 15 and 16 contribute materially although in conventional manner to make the tester operation foolproof, but in the interests of brevity they will not be specifically described.

It is apparent that the apparatus of the preceding figures is automatic and rapid in its operation, testing two lengths of pipe substantially as fast as a single length could be handled in this apparatus or in a comparative single length pipe tester. It is further evident that multiple testing of a higher number of lengths of pipe is feasible through modification of the present compound apparatus by adding certain duplicate components, with a slight resulting increase in its overall size. Each test operation of course is expedited in the fact that the receiver slide 15 of FIG. 1 has limited movement at most in covering the pipe and by the further fact that the movable heads $12_1$ and $12_2$ travel rapidly for a period before they are set in slow-down to make the last portion of their travel so as to more gently cover the ends of the pipe. Although not essential, this feature is desirable to dissipate momentum stored in the moving mass of these heads and their accessory parts, prior to reaching their final set-out position.

It will be appreciated that the unlockable carriage 120 in the movable head mechanism E of FIGURE 1 provides great flexibility to the present apparatus in adapting to runs of specific length groups of pipe, and in preparation for each setting to be sustained the carriage is unlocked to move the heads 12$_1$ and 12$_2$ to a position of approximation to the given length of the pipe group and thereafter relocked enabling the automatic operation to be undertaken.

Variations within the spirit and scope of the invention described are equally comprehended by the foregoing description.

We claim:

1. In combination, a test bench having a sealing head for engaging prealigned pipe, head moving mechanism, an alignment table having a pipe alignment stop for contacting one end of the pipe length to be received in said test bench, a measuring gage shiftably mounted on said table with respect to the location of the other end of said pipe length and provided with pipe-actuated feeler means enabling said measuring gage in a momentarily set-out position thereof to detect that end location of the pipe length, and end location responsive control mechanism connected to said head moving mechanism operable to stop the movable sealing head at a distance of approach to the pipe in accordance with the measured length of the pipe received.

2. In combination, a test bench having a traveling head for engaging prealigned pipe, an alignment table having a pipe alignment stop for contacting one end of a pipe length destined for said test bench, a gage member shiftably mounted on said table with respect to the location of the other end of said pipe length and provided with pipe actuated feeler means enabling said member in a momentarily set-out position thereof to detect that end location of the pipe length thereon, apparatus for automatically storing an electrical quantity derived in dependence on said momentarily set-out position of said gage member occurring during prealignment prior to the pipe being received in said bench, and controlled head-moving apparatus having control means responsive to the magnitude of said stored electrical quantity determined by the previously set-out position of said gage member to accurately stop said head traveling in the direction of approach to a prealigned length of pipe received.

3. In combination, a test bench having a traveling head for engaging prealigned pipe, an alignment table having grounded metal parts so as to ground each length of pipe contacted thereby and having a pipe alignment stop part for contacting each length of pipe thereon destined for said test bench, a gage member shiftably mounted on said table with respect to the location of the other end of said pipe length and provided with a current conducting feeler plate which is normally insulated and which enables said member in a momentarily set-out position to detect that end location of the pipe length due to grounding thereon, apparatus for automatically storing an electrical quantity derived in dependence upon and fixed at the time of said feeler plate grounding during the momentarily set-out position of said gage member, and controlled head-moving apparatus including means responsive to the magnitude of said stored electrical quantity determined by the previously set-out position of said gage member to reduce the speed of travel of the head as it approaches the length of prealigned pipe and then to stop that head at a distance to precisely receive the pipe.

4. In combination, a test bench having at least two movable heads for engaging prealigned pipe, an alignment table having a pipe alignment stop for contacting the number of pipe lengths thereon to be received in said test bench, individual gage members shiftably mounted on said table with respect to the nonaligned end of said pipe lengths and provided with fixed feeler plates enabling said members in a momentarily set-out position thereof to detect those end locations of the pipe lengths confronting same, apparatus for automatically storing an electrical quantity derived in dependence upon and at the time of said momentarily set-out position of the individual gage members prior to said number of pipe lengths being received in said bench, head reciprocating means individual to said movable heads, and voltage differential control mechanism responsive to the magnitude of said stored electrical quantity determined by the previously set-out positions of said gage members and connected to said head reciprocating means to reduce the speed of travel of the individual head at a point approaching zero differential control voltage, and having a satisfied position at zero differential voltage to stop each head at a distance of approach approximately equal to the predetermined length of the associated pipe received.

5. In combination, a test bench having a movable head for engaging prealigned pipe, an alignment table having a pipe alignment stop contacting one end of a length of pipe thereon to be received in said test bench, a gage member shiftably mounted on said table with respect to the location to the other end of said pipe and provided with fixed feeler means enabling said member in a momentarily set-out position to detect that end location of the pipe length, head reciprocating means, and means connected to control said head reciprocating means comprising a plurality of potentiometer means operating in circuit with one another whereby operation of one potentiometer electrically transmits a signal determined thereby in dependence upon the momentarily set-out position of said gage member, operation of another potentiometer duplicates the transmitted operation of the one potentiometer so as to fix, in its satisfied position, an electrical quantity derived in dependence on said signal determined by the set-out position of said gage member, and operation of a further potentiometer positioned by said head reciprocating means so as to reach a satisfied position stops the latter in its path of travel at a distance derived proprotionately to said fixed electrical quantities.

6. In combination, a test bench having traveling heads for engaging prealigned pipe, an alignment table having an alignment stop common to one end of pipe lengths to be received in said test bench, gage members shiftably mounted on said table with respect to the location of the nonaligned ends of said pipe lengths and provided with pipe actuated feeler means enabling said members in a momentarily set-out position thereof to detect the end location of the pipe lengths thereon, head reciprocating means individual to said traveling heads, and control means connected to operate said head reciprocating means comprising potentiometer means operating in circuit with one another whereby operation of a plurality of said potentiometer means derives individual electrical quantities in dependence on the momentarily set-out position of said gage members, and operation of further potentiometer means positioned by said head reciprocating means so as to reach a satisfied position stops the latter in their path of travel at a distance derived proportionately to the magnitude of said electrical quantities.

7. In a test bench receiver having sealing heads for testing prealigned pipe, prealignment means comprising a table on which the pipe is positioned for entry directly onto said test bench receiver, a shiftably mounted pipe gage on said table, gage reciprocating mechanism providing a reversible drive operable to drive said gage sufficiently toward the position of the pipe to make momentary contact therewith, and drive reversing means connected to said mechanism and operable in response to said momentary contact.

8. In a test bench receiver having sealing heads for testing prealigned pipe, prealignment means comprising a table on which the pipe is positioned for entry directly onto said test bench receiver, a shiftably mounted pipe gage on said table, gage reciprocating means providing a reversible drive operable to drive said gage into sufficiently positive electrical engagement with the pipe as positioned to momentarily establish current conducting contact completing a first circuit, and a mechanism reversing circuit connected to reverse said drive immediately upon completion of said first circuit.

9. Movable head mechanism for a plural-headed receiver to test pipe for a leakage comprising a frame end support, carrier means common to the plural test heads movable relative to said support, second carrier means individual to the test heads movable relative to the common carrier means first named, first carrier reciprocating means operable to move said first carrier means to dispose said heads in an approximate position for simultaneously confronting pieces of pipe of differing or equal lengths as received, second carrier reciprocating means for causing said relative movement of said test heads, meshing rack and pinion mechanism comprising a rack bar dragged by said heads in response to said relative movement and an electrical device having a pinion connection thereto so as to be adjustable thereby into an electrically satisfied position relative to a second electrical device adjustably operated by means for locating said pieces of pipe prior to their delivery to said mechanism, and satisfied-position responsive control mechanism connected to said second carrier reciprocating means operable to effect independent movement of approach of said second head carrier means to final positions locating the heads in dependence upon individual pipe end locations.

10. In combination with pipe translating and depositing mechanism, a test bench having head reciprocating means arranged with plural movable heads for engaging a like number of lengths of pipe for simultaneously testing same when deposited in said bench, said translating and depositing mechanism comprising prealignment means for bringing one end of each of the plural pipe lengths into substantial coincidence with a vertical plane at right angles to the pipe lengths and parallel to the path along which the pipe lengths are translated as aforesaid for deposit into said bench, plural measuring gauges to measure random lengths of the plurality of pipe lengths with but following the prealignment thereof and carrying contact means to determine the physical location of corresponding non-aligned ends thereof, and delayed control mechanism comprising individual means operated by respective gauges and connected to different ones of said head reciprocating means, whereby upon introduction of a plurality of premeasured lengths of pipe into said bench the plural heads simultaneously advance to the right distance in accordance with the individual random lengths of pipe thereadjacent.

References Cited in the file of this patent

UNITED STATES PATENTS

| | | |
|---|---|---|
| 2,057,367 | Cone | Oct. 13, 1936 |
| 2,551,645 | Stadelman | May 8, 1951 |
| 2,671,338 | Reichl | Mar. 9, 1954 |
| 2,679,748 | Kent et al. | June 1, 1954 |
| 2,702,130 | Grau | Feb. 15, 1955 |
| 2,707,876 | McConnell | May 10, 1955 |
| 2,731,139 | Smith | Jan. 17, 1956 |
| 2,751,781 | McConnell | June 26, 1956 |
| 2,818,182 | Goesch | Dec. 31, 1957 |
| 2,854,114 | Hillyer et al. | Sept. 30, 1958 |
| 2,860,751 | Seigle | Nov. 18, 1958 |
| 2,907,202 | McConnell | Oct. 6, 1959 |
| 2,947,165 | Kirchner et al. | Aug. 2, 1960 |